United States Patent Office 3,100,686
Patented Aug. 13, 1963

3,100,686
METHOD FOR PREPARATION OF SINTERABLE BERYLLIUM OXIDE
Bernard J. Sturm, Oak Ridge, Tenn., assignor to the United States of America as represented by the United States Atomic Energy Commission
No Drawing. Filed Apr. 13, 1962, Ser. No. 187,440
4 Claims. (Cl. 23—183)

My invention relates to the fabrication of beryllium oxide compacts and more particularly to a method of preparing sinterable beryllium oxide.

Because of its favorable nuclear characteristics and physical properties, beryllium oxide is useful as a moderator for high-temperature nuclear reactors. The thermal neutron absorption cross section of this material is low, and the melting point (2550° C.) is sufficiently high for elevated-temperature applications. When fabricated into dense ceramic compacts, beryllium oxide has high thermal conductivity and good thermal-stress resistance. In addition, beryllium oxide is not subject to oxidation. Fabrication of beryllium oxide ceramic compacts may be effected by cold compressing of sinterable beryllium oxide powder, occasionally in combination with an organic binder, into compact form and sintering the compact at an elevated temperature or by other methods such as extrusion and hot pressing.

One of the problems presented in the preparation of reactor-grade beryllium oxide compacts is the provision of high-purity beryllium oxide powder having suitable sinterability. Commercially available beryllium oxide, which is normally prepared by calcination of precipitated beryllium hydroxide, is contaminated with excessive amounts of impurities such as silicon, iron, aluminum and magnesium so that additional purification is desired for nuclear reactor use. The bulk of these impurities may be removed by means of further treatments such as dissolving the oxide in sulfuric acid and either crystallizing beryllium sulfate or precipitating beryllium hydroxide from solution. Beryllium oxide is then obtained by calcination. Even after such treatments, however, substantial portions of these impurities may remain. To provide the desired versatility in designing and constructing nuclear reactors, beryllium oxide for this purpose should be as free as possible of impurities, especially impurities having significant nuclear cross sections.

In order to form compacts with sufficient density for reactor applications, that is, at least 90 percent of theoretical density, the beryllium oxide powder must exhibit a high degree of sinterability. This extent of sinterability has frequently been attained in beryllium oxide prepared by previously employed methods such as calcination of beryllium hydroxide or beryllium oxalate trihydrate. Despite the high sinterability obtained, however, these methods have at least two undesirable features. First, the high density has often been obtained at the expense of purity: that is, the presence of impurities such as silicon or calcium at a level over about 150 parts per million enhances sintering, and this level of these impurities has normally been present in material which has sintered to a high density. Sinterability of beryllium oxide containing lesser amounts of these impurities is decreased, and sintered densities under 90 percent of theoretical generally have resulted when high-purity oxides have been used. Second, the sinterability of beryllium oxide prepared by these methods has varied widely and unpredictably, even within a single lot of material. These variations in sinterability have resulted in non-uniform shrinkage and a lack of reproducibility in compact formation.

It is, therefore, an object of my invention to provide a method of preparing high-purity beryllium oxide.

Another object is to provide a method of preparing beryllium oxide which sinters reproducibly to a high density.

Another object is to provide a method of preparing sintered beryllium oxide compacts.

Other objects and advantages of my invention will be apparent from the following detailed description and claims appended hereto.

In accordance with my invention sinterable beryllium oxide is prepared by precipitating beryllium oxalate monohydrate from aqueous solution, separating the precipitate from the remaining mother liquor and calcining the precipitate. This method is advantageous in that the monohydrate is formed directly in aqueous solution under controlled conditions; a substantial purification is effected in the precipitation step; and compacts of the oxide resulting from calcination of this monohydrate sinter reproducibly to a high density.

I have found that beryllium oxalate monohydrate ($BeC_2O_4 \cdot H_2O$) may be obtained directly by volatilizing water from a saturated beryllium oxalate solution at a temperature of at least 50° C. Beryllium oxalate monohydrate had previously been formed by cooling an oxalate solution to precipitate beryllium oxalate trihydrate ($Be_2C_2O_4 \cdot 3H_2O$) and converting it to the monohydrate by heating. The monohydrate produced from the trihydrate, however, is not equivalent to directly precipitated monohydrate in at least two respects. For example, the trihydrate, being a larger molecule with the additional water of hydration, carries impurities such as silicon, magnesium, aluminum and calcium from the mother liquor to a much greater extent than does the smaller monohydrate. These impurities tend to remain with the mother liquor in the direct monohydrate precipitation. In addition, the monohydrate produced by heating the trihydrate produces an oxide which varies widely from batch to batch in its sintering characteristics. Slight variations in the beryllium oxalate concentration and temperature during the trihydrate precipitation, and in the temperature employed in converting the trihydrate to monohydrate alter oxide physical properties such as particle size and extent of agglomeration, and these properties in turn influence sintering behavior. In contrast, the monohydrate prepared by direct precipitation under the preferred conditions produces, upon being calcined, an oxide having uniform sintering characteristics.

Although my invention is not to be understood as limited to a particular theory, it is postulated that oxide produced from directly precipitated monohydrate does not vary in its physical properties and sintering behavior in the same manner as oxide produced from the trihydrate precipitate because varying temperatures in the intermediate step of converting the trihydrate to monohydrate are avoided due to the elimination of this step. In addition, in the preferred procedure for precipitation of the monohydrate, that is, by boiling a saturated beryllium oxalate solution, precipitation conditions (concentration and temperature) are necessarily uniform and variations in the physical properties of the precipitate are avoided.

The method employed in preparing the starting beryllium oxalate solution is not critical. It is preferred, however, to dissolve beryllium hydroxide in hot aqueous oxalic acid to form the starting solution. Although not critical, a beryllium hydroxide to oxalic acid molar ratio of 1 to 1 may be employed. For the preparation of high-purity beryllium oxide for reactor use it is preferred to employ beryllium hydroxide which has been partially purified to an impurity level not exceeding 1000 parts per million of silicon and 1000 parts per million total of other cationic element impurities. Some of these impurities, in particular silicon, form a precipitate in the hot oxalate solution. These impurities may be removed by filtering the solution prior to forming the beryllium oxalate monohydrate precipitate. Filtration of the solution at a temperature of at least approximately 70° C. is preferred because beryllium oxalate has a suitably high solubility and silicon is rendered insoluble at this temperature.

The solution is converted to a saturated state and beryllium oxalate monohydrate is precipitated by volatilization of water from the solution at a temperature of at least 50° C. At lower temperatures the undesirable trihydrate precipitate is formed. It is preferred to volatilize the water by boiling. At temperatures below the boiling point the evaporation of water required to obtain a precipitate takes place at too slow a rate to provide a practical procedure. The water may be volatilized at practical rates, however, by rapidly bubbling air or other gases which are inert to beryllium oxalate through the solution. Boiling is preferred over the latter procedure both because volatilization is effected more conveniently and because precipitation conditions are necessarily uniform at the boiling point, resulting in uniform precipitate properties. In order to obtain optimum purification, it is preferred to separate the precipitate from solution when approximately 50 percent of the beryllium has been precipitated. Most of the impurities remain with the mother liquor under these conditions. Separation of the precipitate may be effected by conventional methods such as filtration. The beryllium remaining in the mother liquor may be recovered by precipitation with ammonium hydroxide, freed of the bulk of major impurities by the above-mentioned procedures such as sulfide precipitation, and recycled. The solution containing the precipitate is maintained at a temperature of at least 50° C. until the precipitate has been separated therefrom. Otherwise, cooling of the monohydrate while in contact with the solution will permit it to form the trihydrate by reaction with the solution.

The monohydrate precipitate is then converted to beryllium oxide by calcining. The calcination temperature is selected to provide optimum sinterability. A temperature of approximately 800° C. to 1000° C. may be employed, and about 900° C. is preferred.

The resulting beryllium oxide may be fabricated into compacts by conventional forming methods such as hot pressing, extrusion or cold pressing followed by sintering, with the latter method being preferred. In this method the oxide is first granulated in order to obtain suitable density in the subsequently prepared "green" or unsintered compacts by means of prepressing to form a solid body and comminuting the body. The pressure employed in prepressing is not critical, but a pressure of about 1500 pounds per square inch is preferred. The body is comminuted by means of crushing or grinding to produce free-flowing granules which pass a 30 mesh screen. The granules are then compressed into compacts of the desired shape, with a pressure within the range of about 5,000 to 10,000 p.s.i. being preferred for this step. The pressure is critical only to the extent that a green or unsintered density of about 1.6 grams per cubic centimeter is achieved. The compacts are then sintered by heating to a temperature of at least approximately 1400° C., and preferably about 1650° C. in an atmosphere of an inert gas such as helium or about 1750° C. in a hydrogen atmosphere. Compacts prepared by this method exhibit a density of about 91 percent of theoretical. (Theoretical density is about 3.02 g./cc.)

My invention is further illustrated by the following examples.

*Example I*

A beryllium oxalate solution was prepared by combining 575 grams of beryllium hydroxide, 1680 grams of oxalic acid in the form of $H_2C_2O_4 \cdot 2H_2O$ and sufficient water to produce 4 liters of solution. The solution was then heated to a temperature of 70° C., whereupon a precipitate was formed. The precipitate was removed by filtration. The solution was then boiled at about 102° C. After about one liter of water had been boiled off, a precipitate began forming. The solution was further boiled until the remaining volume of solution was reduced to about 1700 milliliters. The solution was then vacuum filtered at the boiling point with a Büchner funnel maintained near this temperature. The resulting precipitate weighed 724 grams. A portion of this precipitate was then fired at a temperature of 900° S. for 8 hours to produce beryllium oxide in a yield of 22% by weight, this yield being consistent with the decomposition of $BeC_2O_4 \cdot H_2O$. The beryllium oxide was then formed into sintered compacts by means of the following procedure: The BeO was initially compressed at 1500 p.s.i., then ground to pass a 30 mesh screen. The resultant granules were then pressed into a compact having a green density of 1.6 g./cc. The resultant compact was then sintered at 1650° C. in a helium atmosphere. The density of the sintered compact was 91 percent of theoretical.

*Example II*

In order to determine the degree of purification achieved in the method of Example I, spectrochemical analyses were made of the material obtained at four points in the course of producing the beryllium oxide: (A) the initial beryllium hydroxide; (B) the precipitate removed by filtration at 70° C. prior to boiling; (C) the beryllium oxalate monohydrate obtained from the boiling oxalate solution; and (D) beryllium oxalate trihydrate obtained by cooling the oxalate solution after removal of beryllium oxalate monohydrate. In each case the material was calcined, and the resulting oxide was analyzed. The results of these analyses, in parts per million parts beryllium oxide, are as follows:

| Impurity | A | B | C | D |
| --- | --- | --- | --- | --- |
| Aluminum | 50 | 400 | 10 | 100 |
| Calcium | 140 | 250 | 100 | 350 |
| Iron | 50 | 200 | 10 | 25 |
| Magnesium | 300 | 500 | 20 | 50 |
| Silicon | 300 | 5,000 | 10 | 30 |

It may be seen from the above a high degree of purification is obtained by precipitating beryllium oxalate in monohydrate form. Silicon is removed primarily with the precipitate initially formed upon heating the solution. A minor portion of the other impurities is also removed by this means, but substantial amounts of these impurities remain in the mother liquor, as evidenced by the high impurity content of the trihydrate precipitate formed therein.

The above examples are merely illustrative and are not to be understood as limiting the scope of my invention, which is limited only as indicated by the appended claims. It is also to be understood that variations in procedure and apparatus may be employed by one skilled in the art without departing from the scope of my invention.

Having thus described my invention, I claim:

1. The method of separating impurity values in the group consisting of silicon, magnesium, calcium, aluminum and iron values from beryllium values in an aqueous beryllium oxalate solution containing the same which comprises heating said solution to a temperature of about 70° C., whereby a silicon-enriched precipitate is formed, separating said precipitate from said solution at a temperature of at least about 70° C., boiling said solution, whereby beryllium oxalate monohydrate is precipitated, and separating the resulting precipitate from the remaining mother liquor at a temperature of at least 50° C.

2. In the process for preparing beryllium oxide which comprises precipitating beryllium oxalate from aqueous solution containing the same, together with values of at least one impurity element in the group consisting of silicon, magnesium, calcium, aluminum and iron, separating the resulting precipitate from the remaining mother liquor and calcining said precipitate, the improvement which comprises volatilizing water from said solution at a temperature of at least 50° C., whereby beryllium oxalate monohydrate is precipitated, and separating said precipitate from the remaining mother liquor at a temperature of at least 50° C.

3. The improvement of claim 2 wherein said water is volatilized by boiling.

4. In the process of preparing sintered beryllium oxide compacts which comprises precipitating beryllium oxalate from aqueous solution containing the same, together with values of at least one impurity element in the group consisting of silicon, magnesium, calcium, aluminum and iron, separating the resulting precipitate from the remaining mother liquor, calcining said precipitate whereby beryllium oxide is formed, compressing said beryllium oxide into compacts and sintering said compacts, the improvement which comprises boiling said solution, whereby beryllium oxalate monohydrate is precipitated, and separating said precipitate from the remaining mother liquor at a temperature of at least 50° C.

References Cited in the file of this patent
UNITED STATES PATENTS

| | | |
|---|---|---|
| 2,974,012 | Cooperstein et al. | Mar. 7, 1961 |
| 3,025,137 | Murray et al. | Mar. 13, 1962 |